United States Patent
Singh (10) Patent No.: US 11,971,470 B2
(45) Date of Patent: Apr. 30, 2024

(54) BEAMFORMING HARDWARE ACCELERATOR FOR RADAR SYSTEMS

(71) Applicant: TEXAS INSTRUMENTS INCORPORATED, Dallas, TX (US)

(72) Inventor: Jasbir Singh, Bengaluru (IN)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 18/322,805

(22) Filed: May 24, 2023

(65) Prior Publication Data

US 2023/0324538 A1 Oct. 12, 2023

Related U.S. Application Data

(63) Continuation of application No. 17/094,338, filed on Nov. 10, 2020, now Pat. No. 11,709,248.

(51) Int. Cl.
*G01S 13/58* (2006.01)
*G01S 7/35* (2006.01)
(Continued)

(52) U.S. Cl.
CPC ............ *G01S 13/584* (2013.01); *G01S 7/352* (2013.01); *G01S 13/0209* (2013.01);
(Continued)

(58) Field of Classification Search
CPC .... G01S 13/584; G01S 7/352; G01S 13/0209; G01S 7/356; G01S 13/931; H01Q 3/40
(Continued)

(56) References Cited

U.S. PATENT DOCUMENTS 4,170,006 A * 10/1979 Falk ..................... G01S 13/9043
342/25 D
6,822,606 B2 * 11/2004 Ponsford ................... G01S 3/74
342/159
(Continued)

FOREIGN PATENT DOCUMENTS

CN 110376587 A 10/2019
EP 3651379 A1 * 5/2020 ............... H01Q 1/06
(Continued)

OTHER PUBLICATIONS

Search Report, dated Feb. 3, 2022, Application No. PCT/US 2021/057500, 8 pages.

*Primary Examiner* — Nuzhat Pervin
(74) *Attorney, Agent, or Firm* — Michael T. Gabrik; Frank D. Cimino (57) ABSTRACT

A non-transitory computer-readable medium stores instructions executable by a processor to process data from a radar circuit having multiple antennas. The instructions direct the processor to iteratively access a N×M range matrix indexed by N velocity bins and M antenna combinations to obtain unique X×Y range slices of the N×M range matrix, in which X is a lesser multiple of N and Y is a lesser multiple of M; iteratively access a M×S steering matrix indexed by the M antenna combinations and S hypothesis angles to obtain unique Y×Z steering vector slices of the M×S steering matrix, in which Z is a lesser multiple of S; combine the first X×Y range slice with the first Y×Z steering vector slice to form an intermediate slice, combine each subsequently accessed X×Y range slice and corresponding Y×Z steering vector slice and add the combination to the intermediate slice until a beamforming slice is formed that incorporates data for all M antenna combinations for the particular set of
(Continued)

X velocity bins and Z hypothesis angles. An operation is then performed on the beamforming slice.

18 Claims, 10 Drawing Sheets (51) Int. Cl.
 *G01S 13/02* (2006.01)
 *G01S 13/931* (2020.01)
 *H01Q 3/40* (2006.01)
(52) U.S. Cl.
 CPC .............. *G01S 7/356* (2021.05); *G01S 13/931* (2013.01); *H01Q 3/40* (2013.01)
(58) Field of Classification Search
 USPC .......................................................... 342/21
 See application file for complete search history.

(56) References Cited

U.S. PATENT DOCUMENTS

| | | | | |
|---|---|---|---|---|
| 9,599,702 | B1* | 3/2017 | Bordes | G01S 13/18 |
| 9,759,806 | B2* | 9/2017 | Kishigami | G01S 7/02 |
| 10,367,574 | B1* | 7/2019 | Buer | H04B 7/18513 |
| 10,554,451 | B1* | 2/2020 | Stockmaster | H04L 25/03891 |
| 10,628,515 | B2* | 4/2020 | Chao | G06F 17/16 |
| 10,959,114 | B2* | 3/2021 | Hadani | H04L 25/0226 |
| 11,238,130 | B2* | 2/2022 | Xu | G06V 10/82 |
| 11,579,242 | B2* | 2/2023 | Rao | G01S 7/023 |
| 11,709,248 | B2* | 7/2023 | Singh | G01S 13/0209 342/21 |
| 2006/0082491 | A1* | 4/2006 | Arikan | G01S 13/524 342/99 |
| 2007/0103362 | A1* | 5/2007 | Arikan | G01S 13/524 342/111 |
| 2013/0012819 | A1* | 1/2013 | Haugen | G01S 15/8995 600/443 |
| 2013/0325820 | A1* | 12/2013 | Grube | G06F 11/0727 707/691 |
| 2015/0049578 | A1* | 2/2015 | Hoctor | G01S 7/52046 367/7 |
| 2016/0182269 | A1* | 6/2016 | Hadani | H04L 27/2634 375/267 |
| 2017/0108581 | A1* | 4/2017 | Morley | G01S 13/08 |
| 2018/0106898 | A1* | 4/2018 | Baskaran | G01S 7/4802 |
| 2018/0259620 | A1* | 9/2018 | Maher | G01S 13/06 |
| 2019/0205696 | A1* | 7/2019 | Owechko | G06F 18/2134 |
| 2020/0081110 | A1* | 3/2020 | Nam | G01S 13/343 |
| 2020/0284896 | A1* | 9/2020 | Henretty | G01S 7/411 |
| 2020/0326423 | A1* | 10/2020 | Maor | G01S 13/42 |
| 2021/0135733 | A1* | 5/2021 | Huang | G06N 3/084 |
| 2021/0152282 | A1* | 5/2021 | Huang | H04B 7/08 |
| 2021/0364616 | A1* | 11/2021 | Wang | G01S 13/584 |
| 2021/0405150 | A1* | 12/2021 | Roh | G01S 7/2923 |
| 2022/0050193 | A1* | 2/2022 | Hornung | G01S 13/58 |
| 2022/0091260 | A1* | 3/2022 | Pearson | G06T 15/08 |
| 2023/0008565 | A1* | 1/2023 | Kishigami | G01S 7/4026 |

FOREIGN PATENT DOCUMENTS

| | | | | |
|---|---|---|---|---|
| EP | 3289421 | B1 * | 6/2021 | ............... G05F 1/12 |
| EP | 3289421 | B1 | 6/2021 | |
| GB | 2602556 | A | 7/2021 | |
| GB | 2602556 | A * | 7/2022 | ........... H04B 7/0413 |
| GB | 2605875 | A * | 10/2022 | ....... H04L 25/03171 |
| GB | 2605875 | A | 10/2022 | |
| WO | 2018160395 | A1 | 9/2018 | |
| WO | WO-2018160395 | A1 * | 9/2018 | ............. G01L 1/241 |

* cited by examiner

BEAMFORMING HARDWARE ACCELERATOR FOR RADAR SYSTEMS

CROSS-REFERENCE TO RELATED APPLICATION

This application is a continuation of, and claims priority under 35 U.S.C. § 120 on, U.S. application Ser. No. 17/094,338, filed on Nov. 10, 2020, the content of which is incorporated by reference herein in its entirety.

BACKGROUND

Some radar systems use beamforming to determine the angle of arrival of objects in the field of view. A radar system implementing beamforming first performs a range fast Fourier transform (FFT) and a Doppler FFT, resulting in a three-dimensional (3D) matrix made up of a set of two-dimensional (2D) range matrices. Each 2D range matrix corresponds to a particular range of distances between a target object and the radar system, called a range bin, and includes ranges of velocities for the target object, called a velocity bin, by antenna combination. The radar system performs beamforming analysis to determine which hypothesis angle from a set of hypothesis angles, represented by steering vectors, most closely aligns with the target object's angle of arrival. To test the set of hypothesis angles, each row of each 2D range matrix in the 3D data matrix is multiplied by each steering vector, and the resulting spectra is summed. If a particular hypothesis angle corresponds to the actual angle of arrival for a target object, the resulting spectra sums constructively; if not, the resulting spectra sums destructively.

Multiplying each row of each 2D range matrix by each steering vector causes each row and each steering vector to be fetched and re-fetched multiple times over the course of the beamforming analysis. These vector multiplications are further complicated by the combination of row-wise and column-wise operations, which cause the 2D range matrix to be transposed multiple times during beamforming analysis. Thus, the total number of operations involved in beamforming analysis is quite high, causing it to be resource intensive for radar systems to perform.

To illustrate, an example radar system calculates 256 range bins, 256 velocity bins, and 16 hypothesis angles. The radar system performs 12 operations to test each hypothesis angle. In total, the radar system performs more than 12 million operations over the course of beamforming analysis to determine angles of arrival for objects in the radar system's field of view. A signal processor able to perform these operations is resource intensive in area of the semiconductor die, calculation time, memory space, and the like. Some radar systems decrease the number of hypothesis angles to reduce the number of beamforming operations, which also decreases the systems' angular resolution. Some radar systems decrease their update rates to allow additional processing time for beamforming operations, which decreases the reaction time for the systems to respond to objects in the field of view.

SUMMARY

In an example, a non-transitory computer-readable medium stores instructions to process data from a radar circuit having multiple antennas. The instructions may be executed by a processor, which may be a hardware accelerator or other suitable component for executing the instructions. The instructions comprises instructions to access a N×M range matrix indexed by N velocity bins and M antenna combinations to obtain a first unique X×Y range slice, of a plurality of unique X×Y range slices that form the N×M range matrix; access a M×S steering matrix indexed by the M antenna combinations and S hypothesis angles to obtain a first unique Y×Z steering vector slice, of a plurality of unique Y×Z steering vector slices that form the M×S steering matrix; and combine the first unique X×Y range slice with the first unique Y×Z steering vector slice to form an intermediate slice. X is a lesser multiple of N, Y is a lesser multiple of M, and Z is a lesser multiple of S.

Instructions are also provided for updating the intermediate slice. Such instructions direct the processor to iteratively access a next unique X×Y range slice from the N×M range matrix, access a next unique Y×Z steering vector slice from the M×S steering matrix, combine the next unique X×Y range slice with the next unique Y×Z steering vector slice, and add the combined next unique X×Y range slice and next Y×Z steering vector slice to the intermediate slice until a beamforming slice is formed that incorporates data for all M antenna combinations for the particular set of X velocity bins and Z hypothesis angles. Instructions are also included for performing at least one operation, e.g., a beamforming operation, on the beamforming slice.

Multiple beamforming slices may be formed, and beamforming operation(s) performed thereon. The multiple beamforming slices may be used to form a N×S beamforming matrix.

In yet another example, a circuit is provided. The circuit may be a hardware accelerator and may be incorporated into a radar device or system. The circuit comprises a memory configured to store an N×M range matrix indexed by N velocity bins and M antenna combinations, and a M×S steering matrix indexed by the M antenna combinations and S hypothesis angles; first and second buffers; and address generator circuitry operably coupled to the first and second buffers. The address generator circuitry is configured to generate addresses for respective unique X×Y range slices to be successively accessed from the N×M range matrix and stored in the first buffer, and generate addresses for respective unique Y×Z steering vector slices to be successively accessed from the M×S steering matrix and stored in the second buffer. X is a lesser multiple of N, Y is a lesser multiple of M, and Z is a lesser multiple of S. The circuit further comprises first selector logic circuitry configured to access the first and second buffers in response to one or more first selection signals to successively output first data, each including a respective unique X×Y range slice, from the first buffer, and to successively output second data, each including a respective unique Y×Z steering vector slice, from the second buffer. The circuit further comprises multiplier and accumulator (MAC) circuitry coupled to the selector logic circuitry and configured to multiply respective pairs of first and second data to generate respective multiplication results, and generate respective summation results. The circuit further comprises second selector logic circuitry coupled to the first selector logic circuitry and the MAC circuitry and configured to successively output at each processing iteration one of the first data, the multiplication result, and the summation result. A processing circuit is configured to process the successive outputs of the second selector logic circuit.

The circuit may further comprise beamforming matrix generation circuitry coupled to the processing circuit and the MAC circuitry, the beamforming matrix generation circuitry configured to generate beamforming slices based on the summation results, each beamforming slice incorporating data for all M antenna combinations for a particular set of X velocity bins and Z hypothesis angles. One or more other components may be included as well.

BRIEF DESCRIPTION OF THE DRAWINGS

For a detailed description of various examples, reference will now be made to the accompanying drawings in which.

DETAILED DESCRIPTION

The beamforming HWAs described herein perform beamforming analysis for a radar system without decreasing the angular resolution or the update rate of the radar system. The described beamforming HWAs divide the data indexed by range, velocity, and antenna combination into a set of 2D range matrices, each of which corresponds to a particular range bin and includes velocity data indexed by antenna combination. Each 2D range matrix is further divided into range slices, unique partial matrices corresponding to particular velocity bins and antenna combinations that together make up the 2D range matrix. The beamforming HWAs store a range slice in a data buffer and perform beamforming operations on the range slice in the data buffer. The resulting slice of beamforming data is stored as part of a larger beamforming matrix corresponding to the 2D range matrix. The beamforming HWAs then begin the process again with a new range slice from the 2D range matrix, until each range slice is analyzed and a complete beamforming matrix for the 2D range matrix is generated. By storing partial slices of the data and performing beamforming operations on each partial slice sequentially, the beamforming HWAs decrease the number of times data is fetched and re-fetched from memory.

An address generator generates an address for the range slice and provides it to a memory interface, which loads the range slice at the specified address into the data buffer. The address generator ensures each successive range slice is unique and the entire 2D range matrix is analyzed. A selector logic circuit coupled to the data buffer transposes the range slice data to perform row-wise and column-wise operations, decreasing the number of operations dedicated to data transposition. Similarly, a second address generator generates an address for the beamforming slice and provides it to the memory interface, which stores the beamforming slice at the specified address. The second address generator ensures each successive beamforming slice is stored at an appropriate location in the memory, without overwriting previously calculated beamforming slices and indexing the beamforming slices based on the velocity bins of the corresponding range slices.

The beamforming operations performed on the range slice can include multiplying the range slice by a steering matrix of steering vectors corresponding to hypothesis angles and summing the result with an intermediate slice corresponding to the same velocity bins. The beamforming HWAs can divide the steering matrix into steering slices, unique partial matrices corresponding to particular antenna combinations and hypothesis angles that together make up the steering matrix. The beamforming HWAs store a steering slice in a second data buffer and output the steering slice and the range slice to a multiplier and accumulator unit (MAC). A third address generator generates an address for the steering slice and provides it to the memory interface, which loads the steering slice at the specified address into the second data buffer. The third address generator ensures each successive steering slice is unique and the entire steering matrix is used. A selector logic circuit coupled to the second data buffer transposes the steering slice to perform row-wise and column-wise operations.

The MAC receives the range and steering slices and multiplies the two slices together, summing the result with intermediate data corresponding to other antenna combinations for the same particular velocity bins and hypothesis angles and generating beamforming data. The beamforming HWAs can perform a magnitude or a log magnitude operation on the beamforming data and store it in a third data buffer. A selector logic circuit and the second address generator can transpose the finalized beamforming slice and store it as part of the beamforming matrix.

Figure 1:
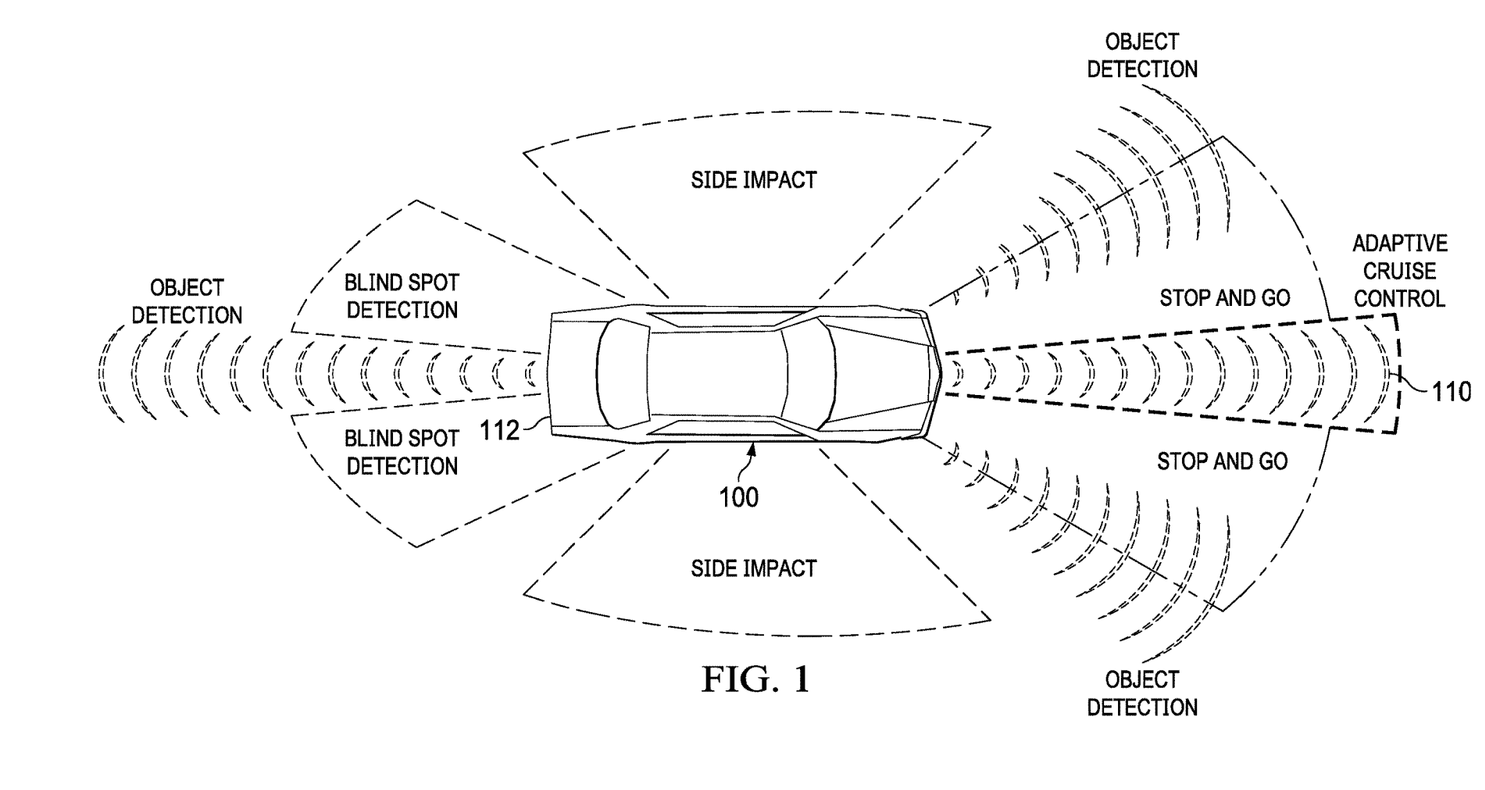
FIG. 1 illustrates an automobile equipped with multiple radar systems for distance and angle of arrival determination.

FIG. 1 is an illustration of an automobile 100 equipped with multiple radar systems 110, 112 for distance and angle of arrival determination. High resolution 77 GigaHerz (GHz) automotive radar systems have been developed to improve driving comfort and safety by measuring the distance from the vehicle to surrounding objects. These distances may be used to instruct a central controller to react appropriately in various driving scenarios, such as parking assistance or collision avoidance. Some vehicles may have a single radar system 110 that may be used for tasks such as adaptive cruise control, object warning, automatic braking, etc., for example. Some vehicles may have several radar systems, e.g., one in front 110 and one in back 112.

Some vehicles may have several systems in front, several systems in back, and systems on the left and right side. For example, a vehicle may have three systems in front in which one faces straight ahead and the other two are angled to the left and right, three in back in which one faces straight back and two are angled to the left and right, and one on the left side and one on the right side, as shown in FIG. 1. Some radar systems, called MIMO radar systems, use multiple transmitter antennas and multiple receiver antennas to improve the resolution of the radar system in determining the angle of arrival. Some MIMO radar systems use TDM to distinguish between chirp signals from different transmitter antennas.

In order to determine the distance and angle of arrival from the radar system to a target object, e.g., for parking assistance, a signal received from the radar system front end is usually processed via a flow of signal processing steps, including Doppler correction and beamforming. Doppler correction compensates for phase differences due to the movement of a target object between transmission of a first chirp signal and a second chirp signal. If left uncorrected, Doppler shift from the target object's radial velocity can introduce error in the distance and angle of arrival determinations. Receiver beamforming estimates the angle of arrival by comparing phases of the received signals to the expected signal phases for an object arriving from a hypothesis angle. The beamforming operations can test a set of unique hypothesis angles, the number of which is chosen based on the desired angle of arrival resolution and other capabilities of the radar system.

Figure 2:
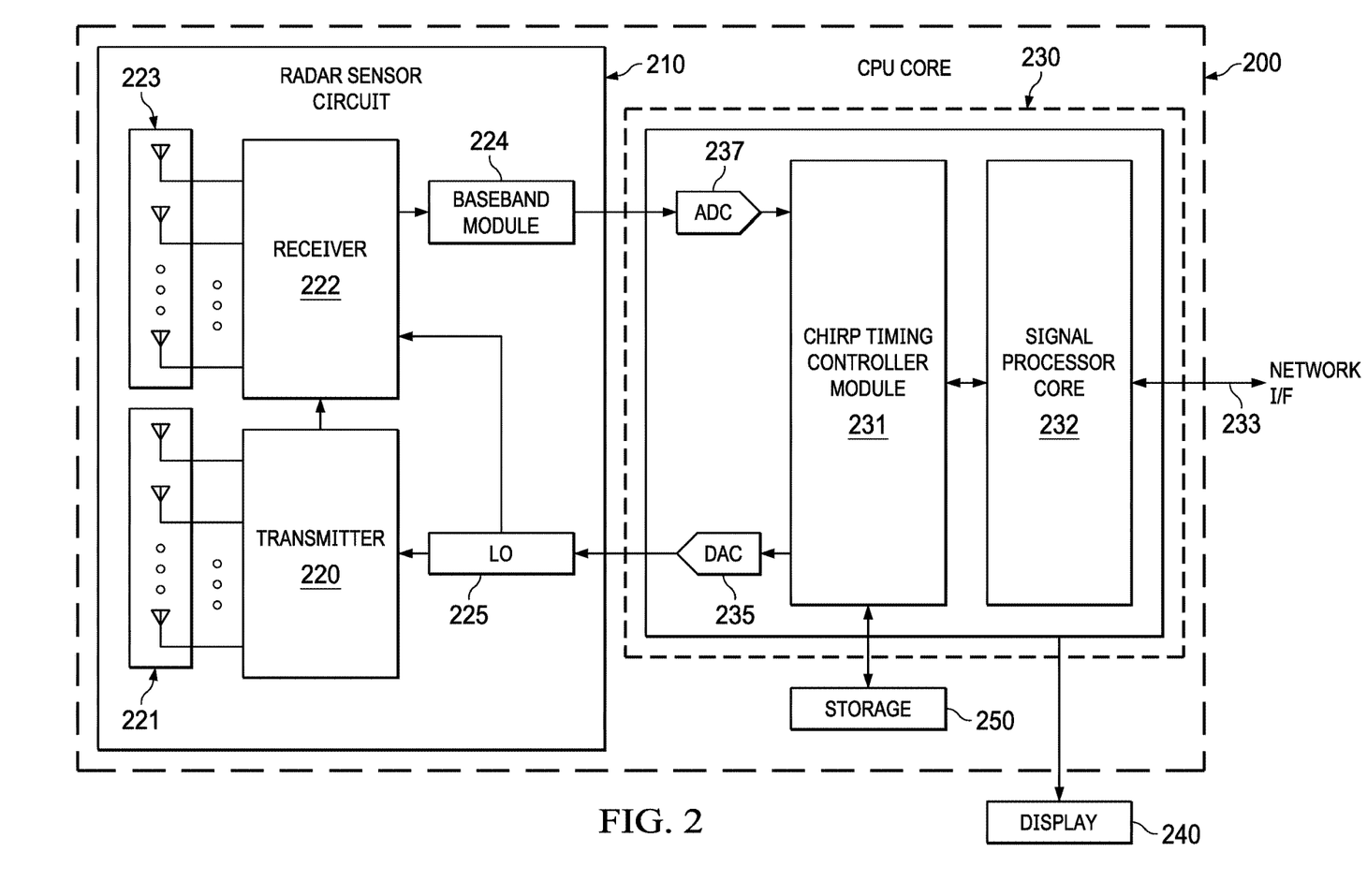
FIG. 2 is a block diagram of an example radar system.

FIG. 2 is a block diagram of an example radar system 200. Radar system 200 may be used in a vehicle, such as automobile 100 of FIG. 1. In this example, radar system 200 includes a radar sensor circuit 210, a central processor unit (CPU) core 230, a display 240, and storage 250. Radar sensor circuit 210 includes a transmitter 220 that drives an antenna array 221 of one or more transmitter (TX) antennas. A receiver 222 receives signals from an antenna array 223 of one or more receiver (RX) antennas. A baseband module 224 amplifies and filters the received signals that are reflected from objects in the path of the transmitted chirp signals. In this example radar system, transmitter 220 operates in the 77 GHz region and produces a frequency modulated continuous wave (FMCW) signal. The continuous wave signal is frequency modulated to form a series of chirps using a local oscillator (LO) 225. In example radar system 200, the TX antenna array 221 and RX antenna array 223 are stationary. In other examples, the antenna arrays may be configured to transmit and receive across a range of area, such as by mechanical movement.

FMCW radar, also referred to as continuous-wave frequency-modulated (CWFM) radar, is capable of determining distance, velocity, and angle of arrival. In a FMCW system, the transmitted chirp signal of a known stable frequency continuous wave varies up and down in frequency over a fixed period of time by a modulating signal. Received reflections are then mixed with the transmitted chirp signal to produce a received beat signal, which will give the distance, velocity, and angle of arrival for the target object after signal processing. Frequency differences between the received reflections and the transmitted chirp signal increase with delay and are therefore proportional to distance.

The phase differences between the received reflections across consecutive chirps allow the velocity of target objects to be computed. The phase differences between the received reflections at a first receiver antenna and the received reflections at a second receiver antenna allow the angle of arrival of target objects to be computed. Thus with an FMCW radar system, the distance between the target object and the radar system, relative velocity of the target object, relative angle of the target object and the like can be calculated.

During normal operation, linear frequency chirps are transmitted, and reflected signals are received. The receiver and transmitter are arranged as a homodyne system so that the received reflections are down-converted directly into the baseband in receiver 222 using a copy of the transmitted signal from LO 225. The baseband signals are then filtered and amplified by filters and variable gain amplifiers by baseband module 224. After converting the baseband signals into the digital domain, time domain to frequency domain transforms such as fast Fourier transforms (FFTs) may be applied and other signal processing performed in order to determine the distance, velocity, and angle of arrival between the target object and the radar system 200.

CPU core 230 comprises one or more CPU cores, digital signal processors, application specific integrated circuits, and the like. The term "CPU core" (singular) is used herein to refer to either a single or multiple CPU cores, and to broadly describe central processing units, digital signal processors, application specific integrated circuits, and the like. CPU core 230 includes a chirp timing controller module 231 that receives a stream of data from receiver antenna array 223 via an analog to digital converter (ADC) 237 and performs chirp generation and control of the transmitter via a digital to analog converter (DAC) 235. A varying voltage tuning control signal from DAC 235 is used to control LO 225. CPU core 230 also includes a signal processor core 232 that may perform signal processing for determining a velocity, an angle of arrival, distance between the target object and radar system 100, and the like.

Signal processor core 232 can provide the determined values to display 240 and/or communicate with other systems via a network interface 233. Network 233 may include various combinations of local area networks (LANs), wide area networks (WANs), the internet and/or other known or later developed wired or wireless communication mechanisms, for example. Storage 250 may be used to store instructions and data received from antenna 223 or signal processor core 232. Storage 250 may be any appropriate storage medium, such as a static random-access memory (SRAM).

Figure 3:
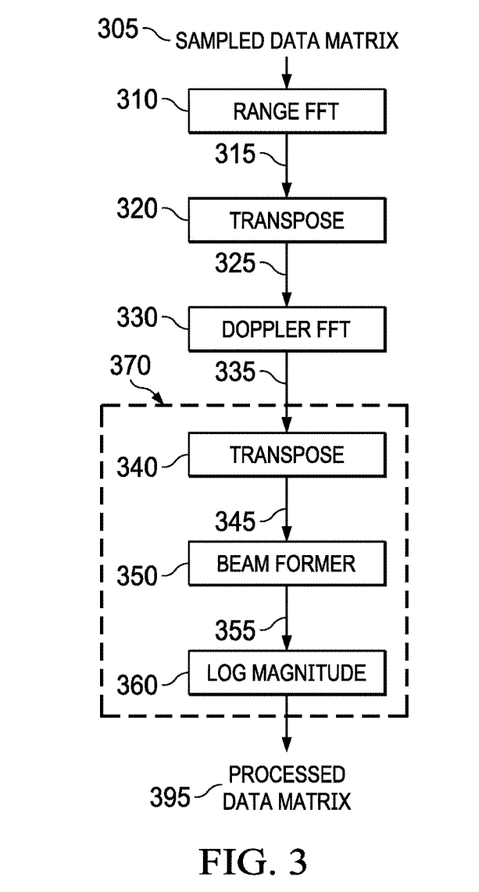
FIG. 3 illustrates, in flow chart form, an example method for processing signals received from a radar system.

FIG. 3 illustrates, in flow chart form, an example process 300 for beamforming analysis. The process shown in FIG. 3 is performed by a processing unit executing instructions stored in a non-transitory computer-readable medium, such as signal processor core 232 executing instructions stored in storage 250 from radar system 200 shown in FIG. 2. In some examples, steps 340, 350, and 360 are performed by a beamforming engine or a beamforming HWA and indicated as beamformer operations 370. First, at step 310, the processing unit performs a range FFT on sampled data matrix 305, for example data from radar sensor circuit 210 sampled by ADC 237. Sampled data matrix 305 is a three-dimensional (3D) matrix including sampled data values from received beat signals indexed by antenna combination over time, (antenna combination×sample×time).

After the processing unit performs the range FFT, the resulting 3D range matrix 315 includes sampled data values sorted into range bins representing ranges of distances between a target object and the radar sensor circuit indexed by antenna combination over time, (antenna combination×range bin×time). At step 320, range matrix 315 is transposed, such that the resulting transposed 3D range matrix 325 is indexed by antenna combination and range bin, (antenna combination×time×range bin). At step 330, the processing unit performs a Doppler FFT on the transposed 3D range matrix 325. The resulting 3D Doppler matrix 335 includes data values sorted into velocity bins representing ranges of velocities for a target object indexed by antenna combination and range bin, (antenna combination×velocity bin×range bin).

At step 340, the Doppler matrix 335 is transposed, such that the transposed resulting 3D Doppler matrix 345 includes data values sorted by antenna combination indexed by velocity bin and range bin, (velocity bin×antenna combination×range bin). Thus, each 2D range matrix included in transposed 3D Doppler matrix 345 corresponds to a particular range bin and includes data values sorted by antenna combination and velocity bin for that particular range bin, (velocity bin×antenna combination). At step 350, the processing unit performs beamforming operations on the transposed Doppler matrix 345 to estimate the angle of arrival. At step 360, the processing unit performs a log magnitude operation to obtain 3D processed data matrix 395, which includes signal peaks in the range bin, velocity bin, and angle of arrival bin corresponding to a target object's distance, speed, and angle of arrival.

Beamforming operations at step 350 can include comparing phases of the received signals stored in the transposed Doppler matrix 345 to the expected signal phases for an object arriving from each of a set of hypothesis angles. For example as described previously herein with respect to the background, the processing unit multiplies each row, that is, velocity bin, of each 2D range matrix included in transposed 3D Doppler matrix 345 by each steering vector in a set of steering vectors, each steering vector representing a unique hypothesis angle from the set of hypotheses angles, and sums the resulting spectra. Thus, the total number of operations for process 300 can be quite large, due to the fetches and re-fetches of each steering vector in the set of steering vectors and each row in each 2D range matrix in the transposed 3D Doppler matrix 345, the data transpositions, the vector multiplications, etc. A signal processor core capable of performing this many operations is resource intensive, both in surface area of the semiconductor die and calculation time, as well as in supplemental components such as memory.

Figure 4:
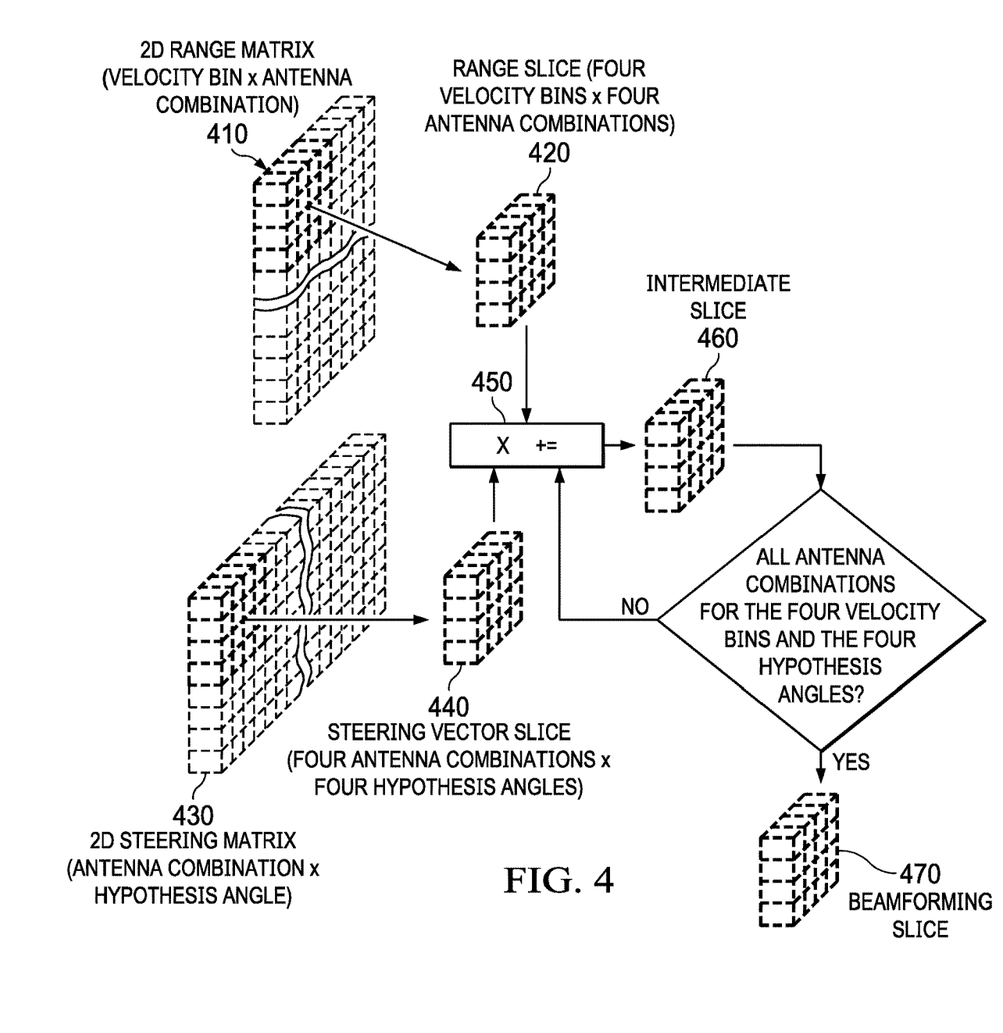
FIG. 4 illustrates an example beamforming processing flow for data received from a radar system.

FIG. 4 illustrates an example beamforming operation flow 400 for data received from a radar system, such as radar system 200 shown in FIG. 2. To reduce the number of times each row in each 2D range matrix 410 is fetched and re-fetched, 2D range matrix 410 is divided into range slices 420. A range slice 420 represents a unique portion of range matrix 410 corresponding to particular velocity bins and antenna combinations. Similarly, to reduce the number of times each steering vector in the 2D steering matrix 430 is fetched and re-fetched, the 2D steering matrix 430 is divided into steering slices 440. A steering slice 440 represents a unique portion of steering matrix 430 corresponding to particular antenna combinations and hypothesis angles. In this example, range slice 420 includes the data values for the first four antenna combinations in the first four velocity bins. Steering vector slice 440 includes the expected signal phase at the first four antenna combinations for the first four hypothesis angles. The range slice 420 and the steering vector slice 440 are stored in respective local data buffers before being provided to a multiplier and accumulator unit (MAC) 450. Respective selector logic circuits (SLCs) associated with the respective local data buffers can transpose each of range slice 420 and steering vector slice 440 as the range slice 420 and steering vector slice 440 are provided to MAC 450, corresponding to transpose operation 340 shown in FIG. 3 for example.

MAC 450 generates an intermediate slice 460 corresponding to the particular range slice 420 and particular steering vector slice 440. Intermediate slice 460 includes the multiplied and accumulated values for the first four antenna combinations in the first four velocity bins and the first four hypothesis angles, and can be stored in a third local data buffer. Because intermediate slice 460 does not include all antenna combinations, the range slice 420 is updated to include the data values for the next four antenna combinations in the first four velocity bins, and the steering vector slice 440 is updated to include the expected signal phase at the next four antenna combinations for the first four hypothesis angles. MAC 450 multiplies the updated range slice 420 and updated steering vector slice 440 together and accumulates the result with the previously calculated intermediate slice 460 for the first four antenna combinations from the third local data buffer. This process continues until the MAC operation on the last slice of the first four velocity bins and the first four hypothesis angles used in this iteration is accumulated onto the intermediate slice in the third local data buffer.

The updated intermediate slice 460 includes beamforming data values for all eight antenna combinations in the first four velocity bins and the first four hypothesis angles. Now that the updated intermediate slice 460 includes all antenna combinations, the updated intermediate slice 460 is a beamforming slice 470 corresponding to the first four velocity bins and the first four hypothesis angles. Other operations can then be performed on beamforming slice 470, such as the log magnitude operation 360 shown in FIG. 3. Beamforming slice 470 can then be stored as-is or transposed before storage by a selector logic circuit. Respective address generators for range slices 420, steering vector slices 440, and beamforming slice 470 ensure that the appropriate range slice and steering vector slice are used to calculate a particular beamforming slice and that each beamforming slice is stored in an appropriate location in memory. The beamforming operation flow 400 can be repeated until every hypothesis angle is tested in every velocity bin of the 2D range matrix 410.

Figure 5:
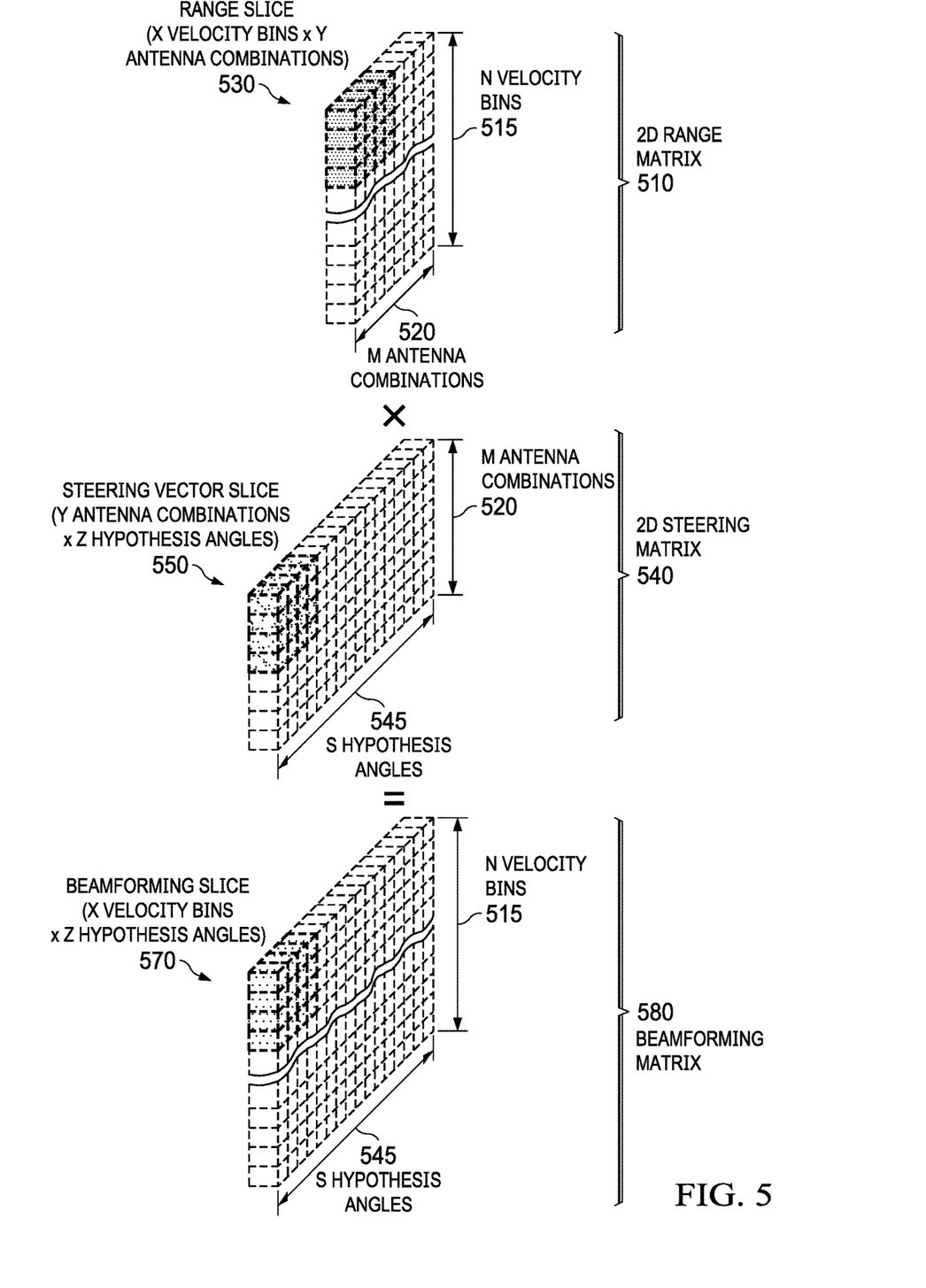
FIG. 5 illustrates an example data addressing flow for data input to and output from a beamforming engine.

FIG. 5 illustrates an example data addressing flow for data input to and output from a beamforming engine. 2D range matrix 510 is included in a 3D Doppler matrix, not shown, and corresponds to a particular range bin. Each row of 2D range matrix 510 corresponds to a particular velocity bin, and each column corresponds to a particular antenna combination, (velocity bin×antenna combination). 2D range matrix 510 includes N velocity bins 515 and M antenna combinations 520, resulting in an (N×M) 2D range matrix 510. A range slice 530 includes a number of velocity bins X and a number of antenna combinations Y, resulting in an (X×Y) range slice 530. In this example, range slice 530 is a (4×4) matrix.

2D steering matrix 550 includes the set of steering vectors for the hypothesis angles of the beamforming engine. Each row of 2D steering matrix 550 corresponds to an expected signal phase at a particular antenna combination, and each column corresponds to a particular steering vector and its associated hypothesis angle, (antenna combination×steering vector). 2D steering matrix includes M antenna combinations 520 and S steering vectors 545, resulting in an (M×S) matrix. A steering vector slice 550 includes a number of antenna combinations Y and a number of hypothesis angles Z, resulting in an (Y×Z) matrix.

As discussed previously herein with reference to FIG. 4 and example beamforming operation flow 400, the appropriate range slices 530 and steering vector slices 550 are multiplied and accumulated to obtain a beamforming slice 570 corresponding to the particular X velocity bins and Z hypothesis angles represented in the range slices and steering vector slices. The process is repeated until a beamforming matrix 580 includes beamforming slices 570 for each velocity bin and each hypothesis angle. Beamforming matrix 580 includes N velocity bins 515 and S steering vectors 555, resulting in an (N×S) matrix.

Figure 6A:
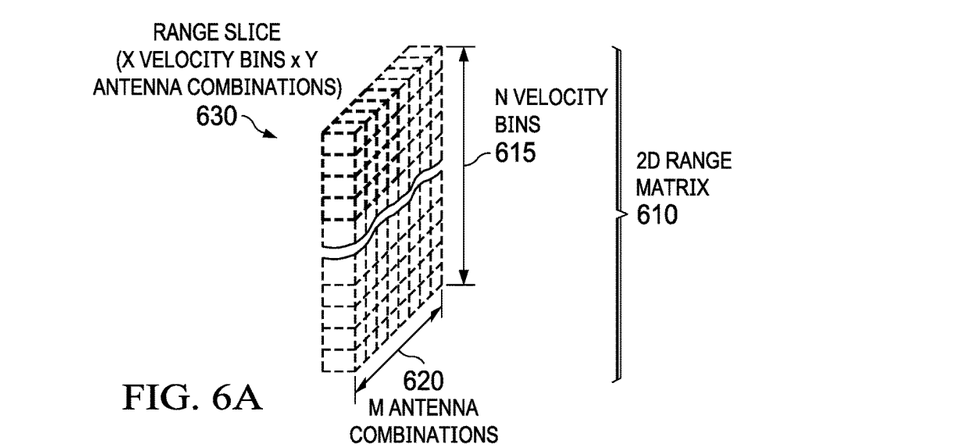
FIGS. 6A-B illustrate count values and indexing values for a range matrix input to a beamforming process.
Figure 6B:
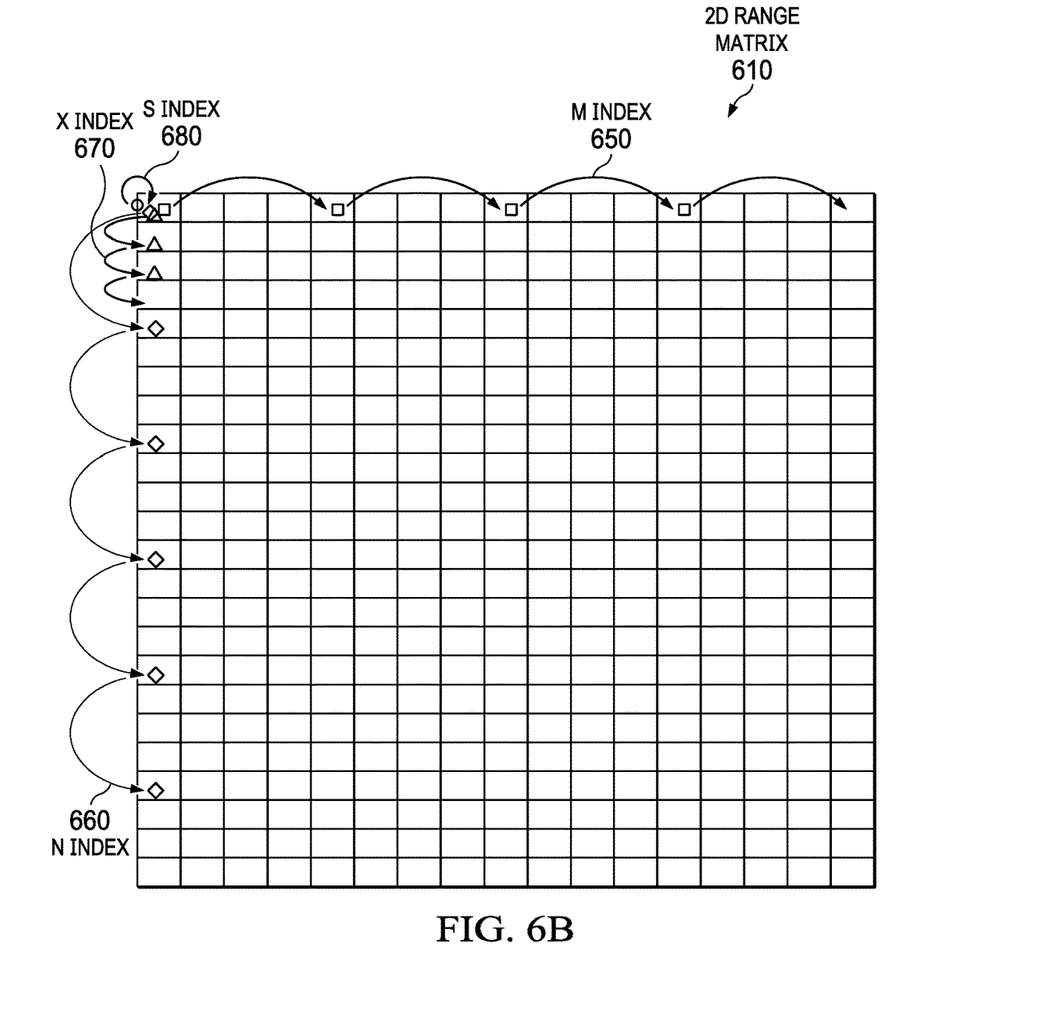

FIGS. 6A-B illustrate count values and indexing values for a range matrix input to a beamforming process. FIG. 6A illustrates count values for 2D range matrix 610, which includes N velocity bins 615 and M antenna combinations 620, resulting in an (N×M) matrix. Each range slice 630 from 2D range matrix 610 includes a number of velocity bins X and a number of antenna combinations Y, resulting in an (X×Y) matrix. To ensure that each range slice 630 is unique and does not overlap with other range slices, an example indexing scheme is shown in FIG. 6B.

In FIG. 6B, an N index 660 ensures that each range slice is taken from an appropriate set of rows, that is, velocity bins, of 2D range matrix 610. Similarly, an M index 650 ensures that each range slice is taken from an appropriate set of columns, that is, antenna combinations, of 2D range matrix 610. For example, a first range slice 630A includes velocity bins 0-3 and antenna combinations 0-3 for each velocity bin. A second range slice 630B includes velocity bins 0-3 as well, but antenna combinations 4-7. An X index 670 is based on the number of antenna combinations Y in the range slice 630 and the total number of antenna combinations M 620 in 2D range matrix 610, to ensure that the N index 660 does not increment until all M antenna combinations for the particular X velocity bins are represented in a beamforming slice. An S index 680 is based on the number of steering vectors and corresponding hypothesis angles in an associated steering matrix, and resets N index 660, M index 650, and X index 670 every time it increments, such that each velocity bin and antenna combination in 2D range matrix 610 is multiplied and accumulated with each steering vector.

Figure 7:
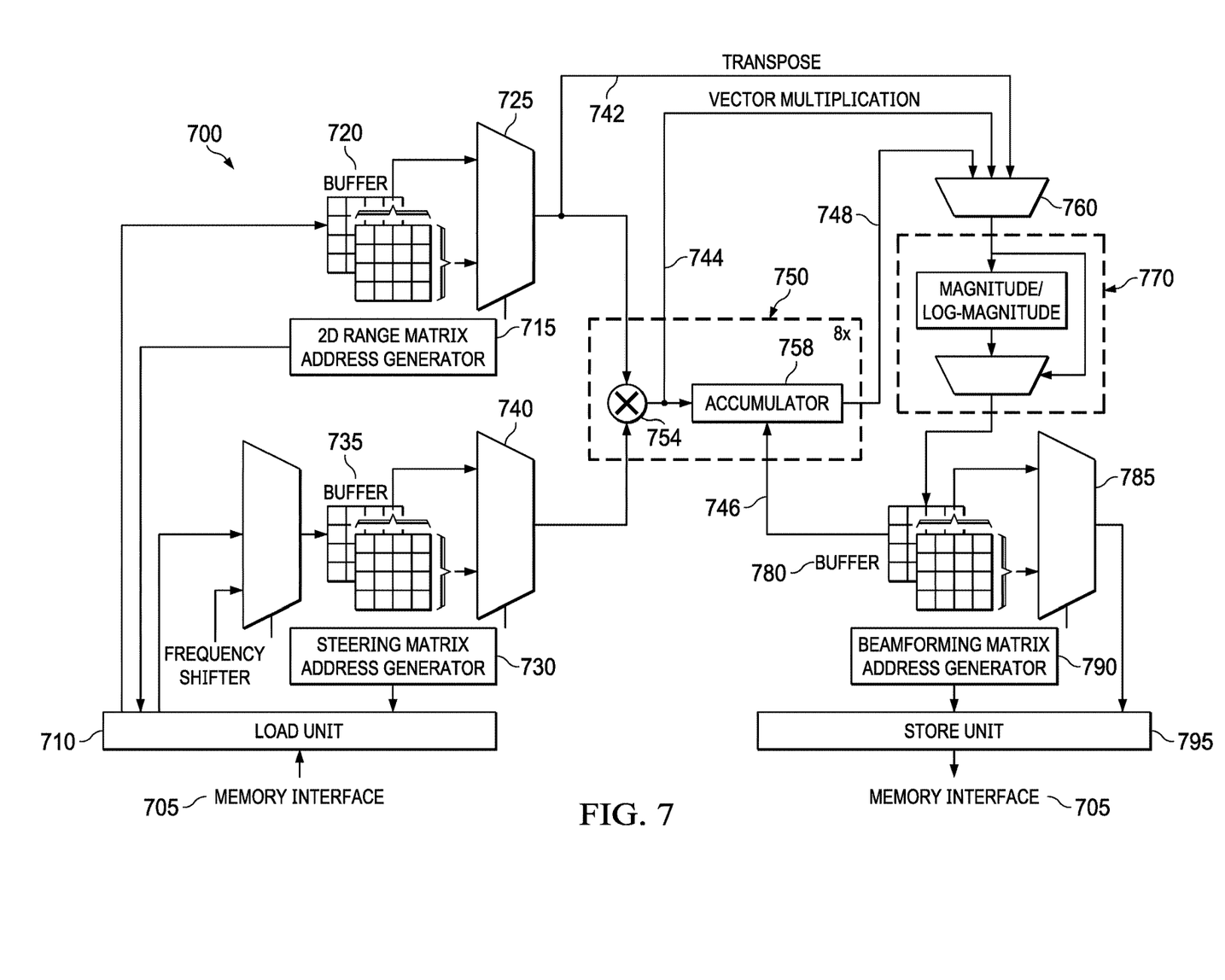
FIG. 7 is a block diagram of an example beamforming hardware accelerator.

FIG. 7 is a block diagram of an example beamforming HWA 700. Beamforming HWA 700 includes a memory interface 705 and a load unit 710 and a store unit 790 which load from and store to a memory via memory interface 705. Beamforming HWA 700 also includes an address generator 715, a buffer 720, and an SLC 725 for loading a range slice such as range slice 530 shown in FIG. 5 from a 2D range matrix in the memory. Address generator 715 generates a look-up address for a particular range slice, for example based on the indexing scheme shown in FIG. 6B, and provides it to load unit 710, which obtains the range slice from memory via memory interface 705 and loads it into buffer 720. A selection signal provided to SLC 725 indicates a particular row and column of buffer 720, and SLC 725 outputs the data value stored at that particular row and column, enabling the range slice to be transposed before it is used in other operations. Address generator 715 generates a second look-up address for another, different range slice, ensuring each range slice is unique and does not overlap with other range slices.

Similarly, beamforming HWA 700 also includes an address generator 730, a buffer 735, and an SLC 740 for loading a steering vector slice such as steering vector slice 550 shown in FIG. 5 from a 2D steering matrix in the memory. Address generator 730 generates a look-up address for a particular steering vector slice, for example using an indexing scheme similar to the one shown in FIG. 6B, and provides it to load unit 710, which obtains the steering vector slice from memory via memory interface 705 and loads it into buffer 735. A selection signal provided to SLC 740 indicates a particular row and column, and SLC 740 outputs the data value stored at that particular row and column, enabling the steering vector slice to be transposed before it is used in other operations. As needed, address generator 730 generates a second look-up address for another, different steering vector slice, ensuring each steering vector slice is unique and does not overlap with other steering vector slices.

A MAC 750 includes a multiplier 754 and an accumulator 758. Multiplier 754 in MAC 750 multiplies the outputs of SLCs 725 and 740 together and provides the result 744 to accumulator 758 and an SLC 760. Accumulator 758 sums the output of multiplier 754 and data 746 in buffer 780 and provides the sum 748 to SLC 760, which also receives the output 742 of SLC 725. A selection signal provided to SLC 760 indicates an operation to be performed, and SLC 760 outputs one of the multiplication result 744, summation result 748, and output 742 based on the selection signal. In one example, the selection signal indicates a transpose operation, causing SLC 760 to output the output 742 from SLC 725 and enabling transposition of the partial range slice stored in buffer 720. In another example, the selection signal indicates a vector multiplication operation, causing SLC 760 to output the multiplication result 744. In a further example, the selection signal indicates an accumulation operation, causing SLC 760 to output the summation result 748.

A magnitude circuit 770 receives the output of SLC 760, and either provides the output unchanged to buffer 780 or performs a magnitude or log magnitude operation on the output, based on the operation to be performed. For example, the magnitude circuit 770 provides the output unchanged to buffer 780 for a transpose operation, but performs a magnitude or log magnitude operation on the output for an accumulation operation. Buffer 780 stores the output of magnitude circuit 770, the intermediate slice such as intermediate slice 460 shown in FIG. 4, for reuse by accumulator 758, for example in subsequent operations to multiply and accumulate other antenna combinations for the particular velocity bins and hypothesis angles represented by the particular range slice and steering vector slice. In response to the intermediate slice including beamforming data for all antenna combinations in the particular velocity bins and hypothesis angles, buffer 780 stores the beamforming slice corresponding to the particular velocity bins and hypothesis angles, which can then be stored more permanently in the memory.

A selection signal provided to an SLC 785 indicates a particular row and column, and SLC 785 outputs the beamforming data value stored at that particular row and column in buffer 780, enabling the beamforming slice to be transposed before it is stored in the memory. Address generator 790 generates a storage address for the beamforming slice and provides it to store unit 795, which receives the beamforming slice from selector logic circuit 785 and stores it in the memory via memory interface 705. As needed, address generator 790 generates a second storage address for another, different beamforming slice, ensuring each beamforming slice is stored in a unique memory location and does not overwrite other beamforming slices. In this example, SLCs 725, 740, 760, and 785 are multiplexers, but any appropriate SLC can be used.

Figure 8:
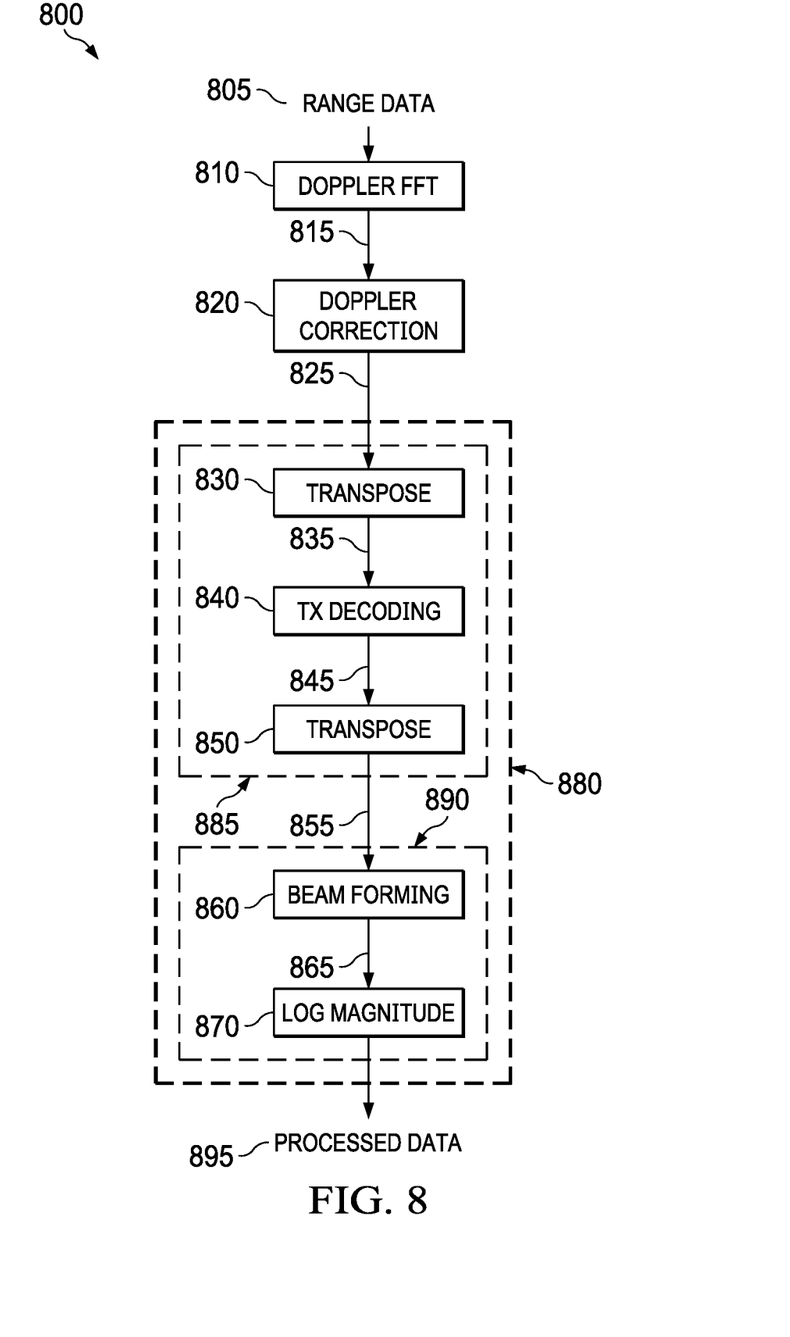
FIG. 8 illustrates, in flow chart form, example methods for processing signals received from a time division multiplexing (TDM) multiple-input, multiple-output (MIMO) radar system.

FIG. 8 illustrates, in flow chart form, an example method 800 for processing signals received from a TDM-MIMO radar system. RX antennas in a TDM-MIMO radar system receive reflected signals, but do not distinguish between reflections of different TX antenna's chirp signals. The received reflections can be sorted into the different TX antenna's chirp signals through TX antenna decoding, and the signals separated by antenna combination improve the angle of arrival resolution of the TDM-MIMO radar system compared to other radar systems. In addition, the TMD-MIMO radar system performs Doppler correction on the received beat signals, to correct for phase differences between different received signals due to the time difference between a first transmitted chirp signal and a second transmitted chirp signal.

The process shown in FIG. 8 is performed by a processing unit executing instructions stored in a non-transitory computer-readable medium, such as signal processor core 232 executing instructions stored in storage 250 from radar system 200 shown in FIG. 2. In some examples, steps 830, 840, 850, 860, and 870 are performed by a beamforming engine or a beamforming HWA, such as beamforming HWA 700 shown in FIG. 7, and indicated as beamformer operations 880. In some implementations, the beamforming HWA performing beamforming operations 880 performs steps 830, 840, and 850 in a single step 885 and steps 860 and 870 as a single step 890, as discussed further herein with reference for FIG. 9.

First, at step 810, the processing unit performs a Doppler FFT on range data 805, resulting in a Doppler matrix 815 which includes data values sorted into velocity bins indexed by RX antenna and range bin, (RX antenna×velocity bin× range bin). At step 820, the processing unit performs Doppler correction, to compensate for phase differences in received signals due to movement of a target object between transmission of a first chirp signal and transmission of a second chirp signal. The resulting corrected Doppler matrix 825 is transposed at step 830 to obtain transposed, corrected Doppler matrix 835. The transposed, corrected Doppler matrix 835 includes data values sorted by RX antenna indexed by velocity bin and range bin, (velocity bin×RX antenna×range bin).

The processing unit performs TX antenna decoding on transposed, corrected Doppler matrix 835 at step 840, which separates the received beat signals for each RX antenna into their component TX chirp signals using a set of demodulation vectors. For example, a TDM-MIMO radar system includes two RX antenna, RX0 and RX1, and three TX antenna, TX0, TX1, and TX2. Transposed, corrected Doppler matrix 835 includes the sampled data values sorted by RX0 and RX1, but does not distinguish between TX0, TX1, and TX2. After TX antenna decoding, the decoded Doppler matrix 845 includes the sampled data values sorted by RX and TX antenna combination, such as by RX0 and TX0, RX0 and TX1, RX0 and TX2, etc.

The decoded Doppler matrix 845 is transposed at step 850, resulting in a transposed, decoded Doppler matrix 855 which includes the sampled data values sorted by TX antenna. For example, transposed, decoded Doppler matrix 855 is ordered such that the received beat signals for TX0 are stored first, TX0 and RX0, and TX0 and RX1. The received beat signals for TX1 are stored next, TX1 and RX0, and TX1 and RX1. At step 860, the processing unit performs beamforming operations on the transposed, decoded Doppler matrix 855 to estimate the angle of arrival. As discussed herein with reference to FIG. 3, the beamforming operations can include multiplying each row of each range matrix included in transposed, decoded Doppler matrix 855 by a set of steering vectors and summing the resulting spectra, resulting in beamforming data matrix 865. At step 870, the processing unit performs a log magnitude operation to obtain processed data matrix 895, which includes signal peaks in the range bin, velocity bin, and angle of arrival bin corresponding to a target object's distance, speed, and angle of arrival.

Figure 9A:
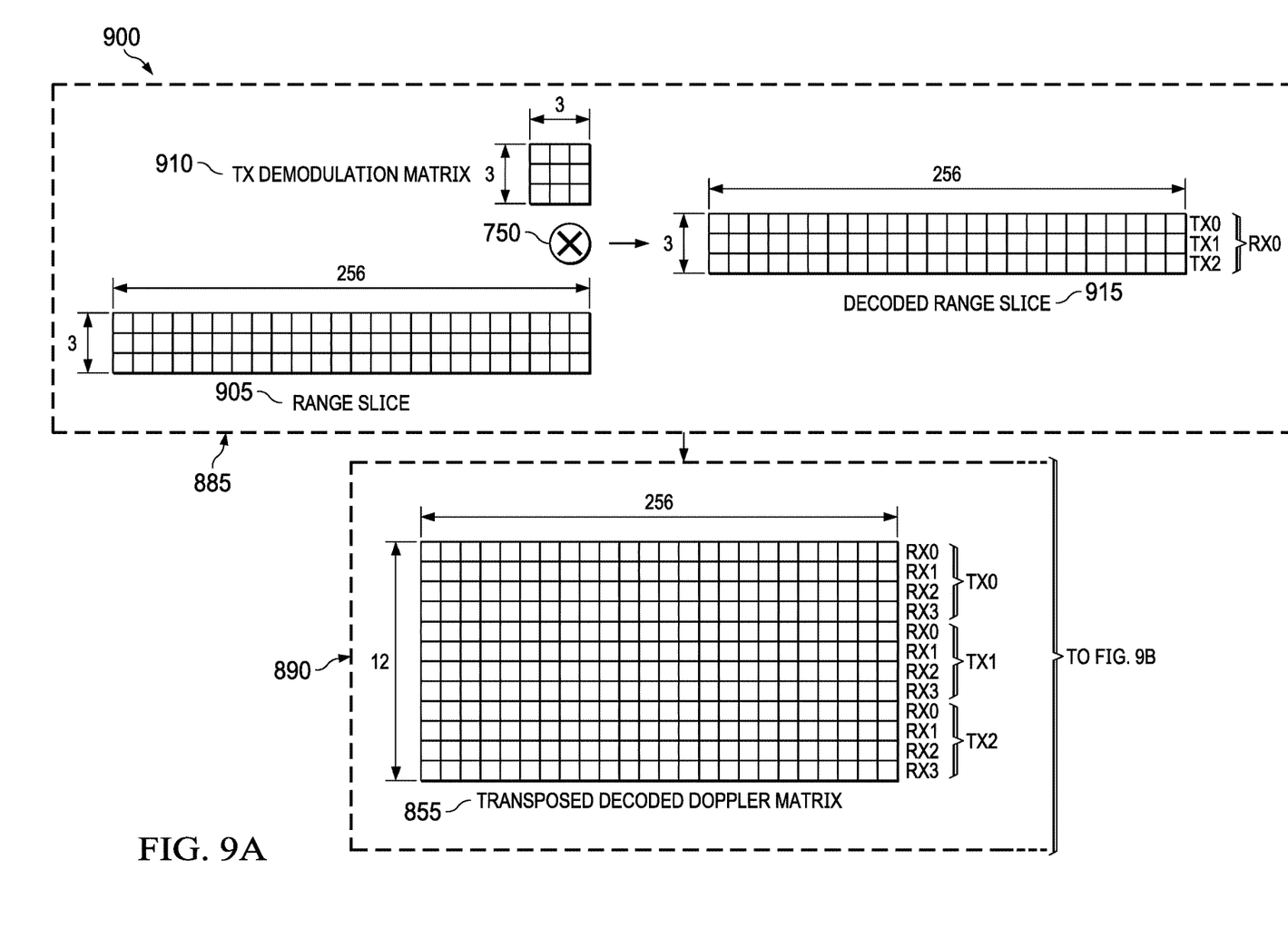
FIGS. 9A-B illustrate an example beamforming processing flow including transmitter decoding for data received from a TDM-MIMO radar system.
Figure 9B:
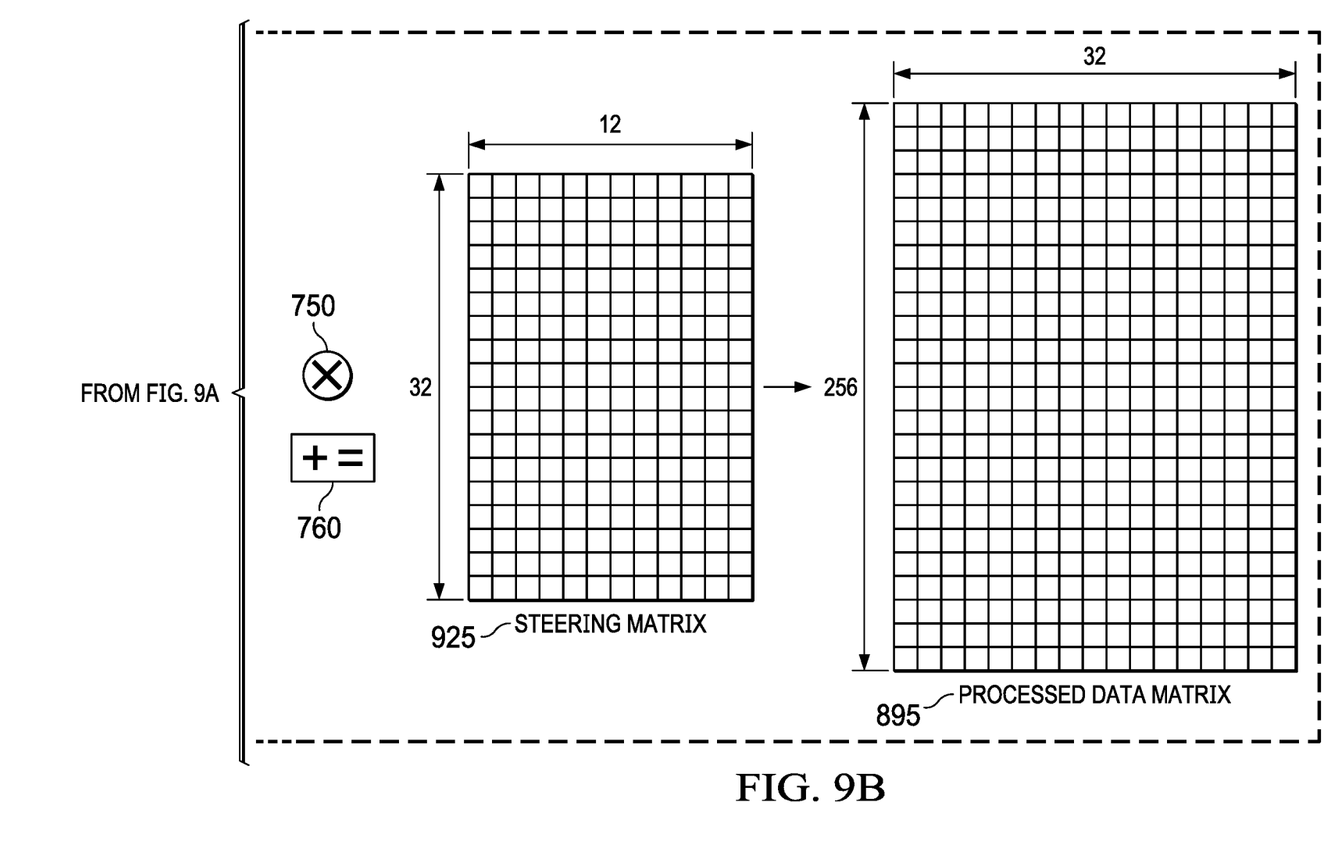

FIG. 9 illustrates an example beamforming processing flow for steps 885 and 890 for data received from a TDM-MIMO radar system. For ease of explanation, FIG. 9 is described with reference to example method 800 in FIG. 8 and beamforming HWA 700 in FIG. 7. To illustrate step 885, address generator 715, buffer 720, and SLC 725 can load a range slice 905 from corrected Doppler matrix 825 in memory. In this example, range slice 905 includes received beat signals corresponding to a particular RX antenna RX0. Address generator 715 generates a look-up address for the received beat signals corresponding to the particular range slice, buffer 720 stores them, and SLC 725 enables them to be transposed, accomplishing the transpose step 830.

Similarly, address generator 730, buffer 735, and SLC 740 can load a TX demodulation matrix 910 from the memory. Multiplier 754 in MAC 750 multiplies the outputs of SLCs 725 and 740 together to accomplish TX decoding step 840 and obtain a decoded range slice 915, which is stored unchanged in buffer 780. Address generator 790 generates a storage address for decoded range slice 915 in the memory, and SLC 785 enables decoded range slice 915 to be transposed at step 880 before it is stored in the memory as part of transposed, decoded Doppler matrix 855.

Step 890 is discussed in more detail previously herein with reference to the operation of beamforming HWA 700. To briefly illustrate step 890, address generator 715, buffer 720, and SLC 725 can load a range slice from transposed, decoded Doppler matrix 855 in memory. Address generator 715 generates a look-up address for the particular range slice, buffer 720 stores it, and SLC 725 outputs it to multiplier 754 in MAC 750. Similarly, address generator 730, buffer 735, and SLC 740 can load a steering slice from a 2D steering matrix in the memory.

In MAC 750, multiplier 754 multiplies the outputs of SLCs 725 and 740 together and provides the result to accumulator 758, which sums the result with an intermediate slice stored in buffer 780, for example, and completes beamforming step 860 to obtain the intermediate slice or, in response to the intermediate slice representing all antenna combinations for the particular velocity bins and hypothesis angles, beamforming data matrix 865. SLC 760 receives beamforming data matrix 865 from accumulator 758 and provides it to magnitude circuit 770, which performs a magnitude or log magnitude operation on beamforming data matrix 865 and completes log magnitude step 870. The resulting processed data matrix 895 is stored in buffer 780. Address generator 790 generates a storage address for processed data matrix 895 in the memory, and SLC 785 enables processed data matrix 895 to be transposed before it is stored in the memory.

Figure 10:
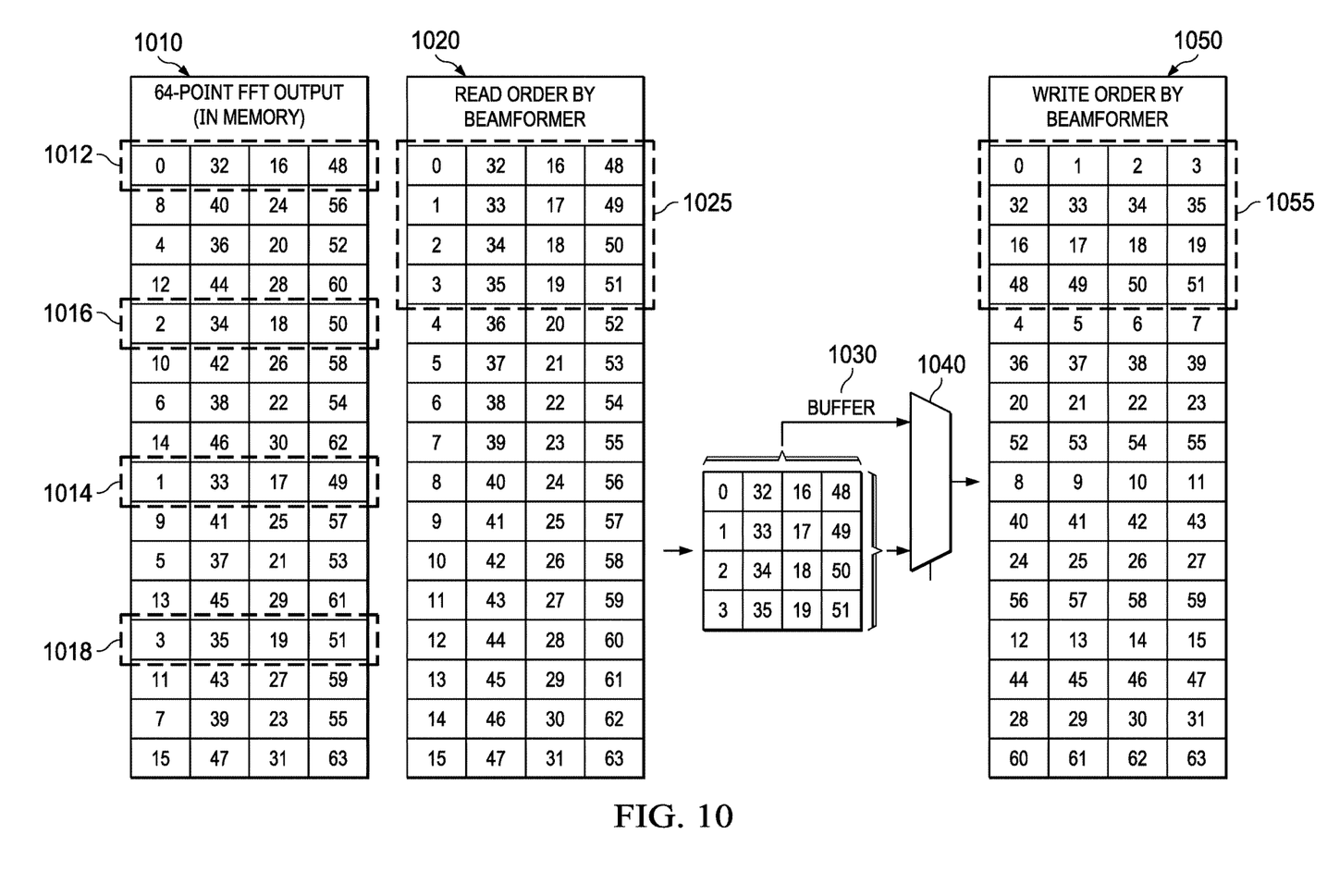
FIG. 10 illustrates an example data addressing flow for data input to and output from a beamforming engine.

FIG. 10 illustrates an example data addressing flow for data input to and output from a beamforming engine. Table 1010 illustrates the data point storage order for a 2D range matrix included in a 3D transposed Doppler matrix, such as 3D transposed Doppler matrix 345 in FIG. 3 and including data values sorted by antenna combination indexed by velocity bin and range bin, (velocity bin×antenna combination×range bin). The Doppler FFT output does not store the data values sequentially. As discussed in reference to FIG. 6B, a sample vector index such as X index 670 indicates which vectors to include in a particular range slice. Instead of beginning at zero and incrementing by one as shown in FIG. 6B, X index 670 can be modified based on the data point storage order shown in table 1010 to begin at and increment by a different number and cause the beamformer to read the data in the order shown in table 1020. The beamformer performs beamforming operations and stores the resulting beamforming slice in local data buffer 1030. Selector logic circuit 1040 allows the beamforming slice in buffer 1030 to be transposed before it is stored in memory in the order shown in table 1050.

In this example, each range slice is a (4×4) matrix. A first range slice 1025 the beamformer reads from memory includes vectors 1012, 1014, 1016, and 1018. The X index in this example is equal to the bit reverse variable divided by four, the number of vectors included in each range slice. This causes range slice 1025 to group the data indexes into columns. The resulting beamforming slice in buffer 1030 is indexed in the read order for range slice 1025, but selector logic circuit 1040 can transpose the beamforming slice as it is stored, such that instead of grouping the data indexes into columns, the stored beamforming slice groups the data indexes into rows.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors. The embodiments are described herein with reference to FTs and FFTs, but may be generalized to other types of time domain to frequency domain transforms such as sine and cosine transforms, and the like.

Modifications are possible in the described embodiments, and other embodiments are possible, within the scope of the claims.

What is claimed is:

1. A non-transitory computer-readable medium storing instructions executable by a processor to process data from a radar circuit having multiple antennas, the instructions comprising instructions to:
   access a N×M range matrix indexed by N velocity bins and M antenna combinations to obtain a first unique X×Y range slice, of a plurality of unique X×Y range slices that form the N×M range matrix, in which X is a lesser multiple of N and Y is a lesser multiple of M;
   access a M×S steering matrix indexed by the M antenna combinations and S hypothesis angles to obtain a first unique Y×Z steering vector slice, of a plurality of unique Y×Z steering vector slices that form the M×S steering matrix, in which Z is a lesser multiple of S;
   combine the first unique X×Y range slice with the first unique Y×Z steering vector slice to form an intermediate slice;
   iteratively:
      access a next unique X×Y range slice from the N×M range matrix,
      access a next unique Y×Z steering vector slice from the M×S steering matrix,
      combine the next unique X×Y range slice with the next unique Y×Z steering vector slice, and add the combined next unique X×Y range slice and next Y×Z steering vector slice to the intermediate slice until a beamforming slice is formed that incorporates data for all M antenna combinations for the particular set of X velocity bins and Z hypothesis angles; and
   perform at least one operation on the beamforming slice.

2. The computer-readable medium of claim 1, wherein the instructions to combine the first unique X×Y range slice with the first unique Y×Z steering vector slice and to combine each next unique X×Y range slice with the corresponding next unique Y×Z steering range slice includes instructions to multiply the particular range slice and the particular steering vector slice.

3. The computer-readable medium of claim 2, further comprising instructions to:
   store the first unique X×Y range slice and each next unique X×Y range slice in a first buffer;
   store the first unique Y×Z steering vector slice and each next unique Y×Z steering vector slice in a second buffer; and
   storing the intermediate slice in a third buffer.

4. The computer-readable medium of claim 3, further comprising instructions to form additional beamforming slices until all N velocity bins of the N×M range matrix and all S hypothesis angles of the M×S steering matrix are considered to form an N×S beamforming matrix that includes N velocity bins and S steering vectors.

5. The computer-readable medium of claim 3, transpose each unique X×Y range slice and each unique Y×Z steering vector slice before combining that unique X×Y range slice and that unique Y×Z steering vector slice.

6. The computer-readable medium of claim 4, further comprising instructions to:
   transpose each beamforming slice, and
   store each transposed beamforming slice.

7. The computer-readable medium of claim 1, wherein the at least one operation performed on the beamforming slice is log magnitude operation.

8. A circuit, comprising:
   memory configured to store an N×M range matrix indexed by N velocity bins and M antenna combinations, and a M×S steering matrix indexed by the M antenna combinations and S hypothesis angles;
   first and second buffers;
   address generator circuitry operably coupled to the memory and configured to:
      generate addresses for respective unique X×Y range slices to be successively accessed from the N×M range matrix and stored in the first buffer, in which X is a lesser multiple of N and Y is a lesser multiple of M; and
      generate addresses for respective unique Y×Z steering vector slices to be successively accessed from the M×S steering matrix and stored in the second buffer, in which Z is a lesser multiple of S;
   first selector logic circuitry configured to:
      access the first and second buffers in response to one or more first selection signals to successively output first data, each including a respective unique X×Y range slice, from the first buffer, and to successively output second data, each including a respective unique Y×Z steering vector slice, from the second buffer;
   multiplier and accumulator (MAC) circuitry coupled to the selector logic circuitry and configured to:
      multiply respective pairs of first and second data to generate respective multiplication results, and
      generate respective summation results;
   second selector logic circuitry coupled to the first selector logic circuitry and the MAC circuitry and configured to successively output at each processing iteration one of the first data, the multiplication result, and the summation result; and
   a processing circuit to process the successive outputs of the second selector logic circuit.

9. The circuit of claim 8, wherein the processing circuit is configured to perform a magnitude or log magnitude operation on each output of the second selector logic circuitry.

10. The circuit of claim 8, further comprising beamforming matrix generation circuitry coupled to the processing circuit and the MAC circuitry, the beamforming matrix generation circuitry configured to generate beamforming slices based on the summation results, each beamforming slice incorporating data for all M antenna combinations for a particular set of X velocity bins and Z hypothesis angles.

11. The circuit of claim 10, wherein the beamforming matrix generation circuitry includes a third buffer configured to store the summation results.

12. The circuit of claim 10, wherein the beamforming matrix generation circuitry is further configured to generate a beamforming matrix based on the beamforming slices.

13. The circuit of claim 8, first selector logic circuitry includes a range slice selector logic circuit having a row address input and a column address input to successively access a particular row and column of the first buffer in response to one of the first selection signals to successively retrieve all data of each unique X×Y range slice.

14. The circuit of claim 13, wherein the range slice selector logic circuit is configured to transpose each unique X×Y range slice.

15. The circuit of claim 13, wherein the first selector logic circuitry includes a steering vector slice selector logic circuit having a row address input and a column address input to successively access a particular row and column of the second buffer in response to another of the first selection signals to successively retrieve all data of each unique Y×Z steering vector slice.

16. The circuit of claim 8, further comprising:
a loader coupled to the address generating circuitry, the loader configured to successively load respective unique X×Y range slices from the memory into the first buffer and successively load respective unique Y×Z steering vector slices from the memory into the second buffer in response to the one or more first selection signals.

17. The circuit of claim 8, wherein the circuit is embodied in a radar device, and the N×M range matrix corresponds to a range bin and includes velocity data for M antenna combinations in the radar device.

18. The circuit of claim 17, wherein each row of the M×S steering matrix corresponds to an expected signal phase at a particular antenna combination, and each column of the M×S steering matrix corresponds to a particular steering vector and its associated hypothesis angle.

* * * * *